United States Patent

[11] 3,585,395

| [72] | Inventors | Maurice A. Robkin<br>Castro Valley;<br>Charles R. Porter, Livermore, both of, Calif. |
|------|-----------|---|
| [21] | Appl. No. | 577,231 |
| [22] | Filed | Sept. 6, 1966 |
| [45] | Patented | June 15, 1971 |
| [73] | Assignee | General Electric Company<br>New York, N.Y. |

[54] CONTROL OF HOLE SIZE IN FILTERS BY MEASURING THE AMOUNT OF RADIATION PASSING THROUGH HOLES AND CORRESPONDINGLY CONTROLLING SPEED OF FILTER MOVING THROUGH ETCHING BATH
6 Claims, 4 Drawing Figs.

[52] U.S. Cl. .................................................. 250/219,
250/83.3, 356/203
[51] Int. Cl. .................................................. G01n 15/08
[50] Field of Search ......................................... 250/219F,
219 WD, 219 DF, 83.3; 88/142 T, 14 W,
356/201, 203; 210/500

[56] References Cited
UNITED STATES PATENTS

| 2,844,068 | 7/1958 | Williams.......................... | 250/219 |
|-----------|--------|-------------------------------------|-------------|
| 3,193,680 | 7/1965 | Anderson........................ | 250/83.3D |
| 3,240,940 | 3/1966 | Dukes et al. .................... | 250/83.3D |
| 3,263,086 | 7/1966 | Brosins et al. ................. | 250/219 |
| 3,267,570 | 8/1966 | Winkler.......................... | 250/83.3D |
| 2,231,186 | 2/1941 | Gould............................ | 88/14 |

Primary Examiner—Walter Stolwein
Assistant Examiner—Martin Abramson
Attorneys—Ivor J. James, Jr., Charles D. B. Curry, Melvin M. Goldenberg and Frank L. Neuhauser ABSTRACT: A method and an apparatus for continuously manufacturing a filter web including continuously measuring and controlling hole size are disclosed. This system basically includes an etching tank through which a fission-fragment irradiated web is fed to form holes therein, a radiation means on one side of the etched web and a radiation detector on the other side which is adjusted to measure only radiation which at least partially passes through holes in the web and means responsive to said measurement to adjust web residence time in the etchant to maintain hole size in the desired range.

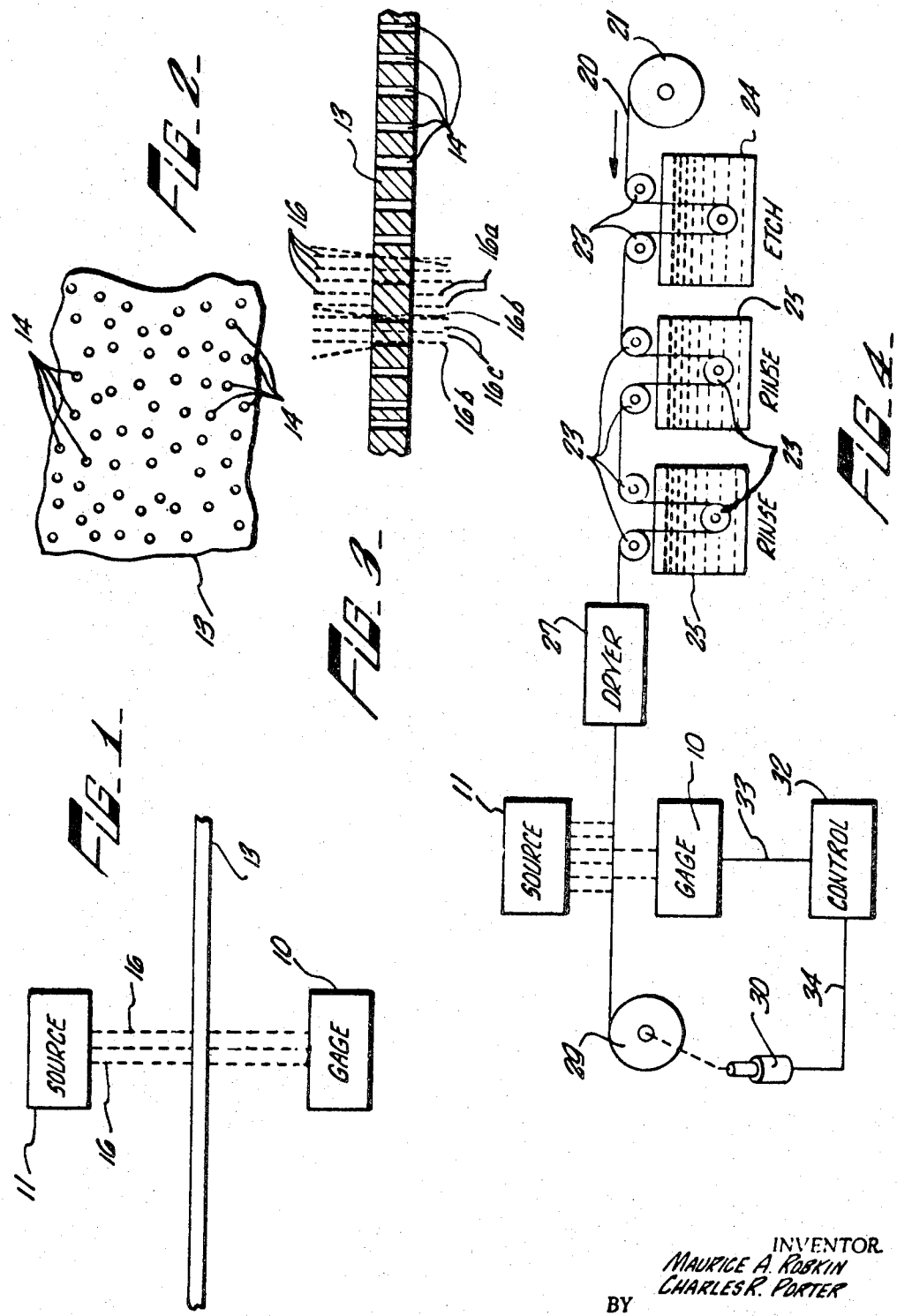

CONTROL OF HOLE SIZE IN FILTERS BY MEASURING THE AMOUNT OF RADIATION PASSING THROUGH HOLES AND CORRESPONDINGLY CONTROLLING SPEED OF FILTER MOVING THROUGH ETCHING BATH

METHOD AND APPARATUS FOR MEASURING PERMEABILITY

This invention relates to a method and apparatus for detecting and measuring very small holes or pores in a member such as a filter element, and for determining the permeability of the member.

Members having very small holes therethrough are useful in many applications such as microfiltration and microanalysis, and as calibrated "leaks" in gas-handling systems. A problem in manufacturing such members is to control the permeability or size and number of holes which extend through the member. Although a microscope or differential-pressure techniques can be used to estimate the permeability of an individual element, these methods are slow and not suited to a continuous production process.

For example, there has recently been developed a filter having holes or pores with diameters in the range of about 0.2 microns to about 10 microns. This filter is made by bombarding a thin sheet of plastic (such as polycarbonate or polyester resins) with heavy, high-energy particles such as fission fragments. This irradiation forms straight, continuous radiation-damage "tracks" through the material, and holes are formed by preferentially etching these damage tracks with a suitable reagent such as sodium hydroxide. Descriptions of this track-etching process and of filters produced by the process are found at page A1443 of Physical Review, volume 133 number 5A (Mar. 1964), and page 249 of Science, volume 143 (Jan. 17, 1964), and in copending patent applications Ser. No. 176,320 filed Feb. 28, 1962, and Ser. No. 368,520 filed May 19, 1964.

It is possible to control the number of damage tracks (and hence the number of holes) formed in the plastic member by regulating the radiation flux of the track-forming particles and the time of irradiation. Filters formed by this process typically have a hole density which is selectable in the range of about $10^5$ to about $10^8$ holes per square centimeter. Size of the etched holes, while uniform from hole to hole, will vary depending on the etching time, composition and geometry of the member, concentration and temperature of the etching reagent, stirring rate, etc.

Close control of hole size is essential to insure that the filter will provide a desired degree of particle-size discrimination with a material which is to be filtered. There thus exists a need to monitor and control hole size during the filter-etching process. Known permeability-measuring techniques do not meet this need because they are not suited for economical and efficient measurement of extremely small holes on a production-line basis.

The method and apparatus of this invention overcome the shortcomings of known techniques, and are adapted for quick and inexpensive measurement of permeability in filters and other members having very small holes. When the invention is used with a filter member formed by the track-etching process, the etched member is positioned between a source of radiation and a radiation-measuring instrument. Radiation passing through the member loses energy in proportion to the thickness of that part of the member traversed. The measuring instrument is set to reject radiation unless it has more energy than would be possible if the radiation had passed through the full member thickness. The radiation accepted by the measuring instrument must, therefore, have passed through less than the full thickness of the member.

The radiation passes through less than the full member thickness only when it passes fully or partially through a hole in the member. The level of accepted radiation is thus proportional to the number and size of the holes and is thus proportional to porosity of the member. Where the number of uniform-size holes in the material is known (as it is in the track-etching process), the instrument response is indicative of hole size, and can therefore be used to monitor the etching process to insure that holes of a desired size are being formed.

The term "radiation" is used in a broad sense, and is intended to include electromagnetic radiation such as light as well as corpuscular emissions such as alpha and beta particles. The specific type of radiation best suited for specific applications is generally determined by the type of material used in the member which defines the holes to be measured. For example, visible light is a convenient type of radiation if the member is formed of a substantially opaque material which blocks light transmission except where a hole is present.

If the member is not opaque to visible light (as is often the case with thin materials used in the track-etching process), an easily generated, controlled and measured form of corpuscular radiation such as alpha particles is suitable. Alpha particles of normal energies are strongly attenuated by most materials of a thickness suitable for filtration use, and therefore alpha particles which pass totally or partially through holes in the material are transmitted with a higher energy than would by possible without the existence of the holes.

Briefly stated, the apparatus of this invention comprises a source of radiation, and radiation-measuring means positioned to receive radiation from the source. A sheet of material having a plurality of holes therethrough is positioned between the source and the measuring means. The material has the quality of blocking or attenuating radiation from the source to the measuring means. Only radiation which has not passed through the full member thickness and therefore at least partially through a hole in the member is measured. The amount of radiation which is transmitter through the member and measured by the measuring means is a function of the permeability or open space through the member. If the number of holes through the member is known, and the holes are of uniform but unknown size, the amount of transmitted radiation is a function of hole size.

The invention will be described in detail with reference to the attached drawings, in which:

FIG. 1 is a invention; diagram showing positioning of the several components of the invention;

FIG. 2 is a greatly enlarged plan view of a portion of a track-etched member having many small holes therethrough;

FIG. 3 is an enlarged cross-sectional view of the member shown in FIG. 2; and

FIG. 4 is a schematic diagram showing the invention as applied to control of a track-etching process.

Referring to FIG. 1, a radiation-measuring instrument or gage 10 of the adjustable-threshold type is positioned to receive radiation emitted by a radiation source 11. In a preferred form of the invention, source 11 is a body of a radioactive material which emits alpha particles. A quantity of say 3 microcuries of americium-241 is a suitable source of alpha radiation. Gage 10 includes a conventional surface barrier or diffused junction solid-state diode detector positioned to receive the radiation, or the gage may be of any other conventional design which is sensitive to the type of radiation emitted by source 11.

Gage 10 also typically includes an electronic amplifier to amplify the output of the diode detector, an adjustable discriminator to receive the amplified detector output, a ratemeter coupled to the discriminator and including a visual indicator or recorder, and appropriate power supplies. A conventional multichannel analyzer is useful to calibrate this measuring system. These components are conventional, commercially available units, and, for brevity, have not been described or illustrated in detail.

A member 13, the permeability of which is to be measured, is positioned between source 11 and gage 10 so radiation from the source reaches the gage only through the member or through holes in the member. As seen in FIGS. 2 and 3, the member has a plurality of holes 14 therethrough. When member 13 is a filter element formed by the track-etching process, the member will typically be a sheet or strip of polycarbonate- or polyester-resin plastic material of about 0.0005-inch thickness. Holes 14 formed by track etching typically have diameters in the range of 0.2 to 10 microns, and are very closely spaced to provide a hole "density" of about $10^5$ to $10^8$ holes per square centimeter of member surface.

As shown in FIGS. 1 and 3, incident radiation from source 11, illustrated schematically by dashed lines 16, loses energy when it passes through the full thickness of member 13, and therefore reaches the radiation gage with less energy than radiation which reaches the gage after passing wholly or partially through a hole in the member. If the member is sufficiently thick, it will absorb all of the incident radiation except that which passes wholly or partially through the holes. If the member is to thin to block radiation transmission completely, it will measurably attenuate the energy of radiation passing through its full thickness (schematically designated as dashed lines 16a in FIG. 3) as compared to energy passing wholly (dashed lines 16b in FIG. 3) or partially (dashed lines 16c in FIG. 3) through the holes.

For example, when the radiation consists of a stream of alpha particles, these particles lose about 1 Mev. (million electron volts) of energy per 10 microns of path length traversed through a plastic member. A 4.5 Mev. alpha particle from an americium-241 source would thus lose about 1.2 Mev. in passing through a plastic member of about 0.0005-inch thickness, whereas similar particles passing partially or wholly through holes 14 would lose little or no energy. Radiation gage 10 is adjusted to detect only alpha particles with energies greater than say 3.5 Mev., and therefore detects and counts only alpha particles which have passed at least partially through a hole.

The comparison of detected radiation to incident radiation is thus a measure of the open space through the member as compared to the irradiated area of the member. That is, knowing the amount of radiation per unit area incident upon the member, the detected radiation per unit area of the member becomes a measure of the permeability of the member. Incident radiation per unit area can be determined by using a calibrated source 11, or by measuring radiation from the source which is incident on gage 10 when member 13 is not interposed between the source and the gage.

The number of holes per unit area which are formed in a filter member manufactured by the track-etching process can be controlled with reasonable accuracy. Furthermore, it is a characteristic of this process that the holes will enlarge uniformly as the etching process is carried out, resulting in a large number of holes of uniform diameter. In these circumstances, the radiation passing through the holes and detected by gage 10 becomes a measure of hole diameter. It is essential to control hole diameter in these microfiltration elements to a high degree of accuracy, in order to produce filters having holes with uniform diameters of a specific size in the range of say 0.2 to 10 microns.

FIG. 4 illustrates the use of the invention to control the etching step in forming a track-etched filter. A long sheet or strip of irradiated but unetched filter material 20 is wound on a feed spool 21. The strip is threaded over a series of rollers 23 to pass through an etching tank 24 (containing a suitable etching reagent remove as sodium hydroxide) and a pair of rinse tanks 25 (containing water or any other suitable washing agent to remove the etching reagent). The strip then passes through a dryer 27, and is reeled onto a takeup spool 29 which is driven by a conventional variable-speed motor 30.

The feed nd takeup spools are of course equipped with conventional apparatus (not shown) such as clutches, drag brakes, and the like to provide tension control and other adjustments for proper reeling action. Radiation gage 10 and source 11 are positioned on opposite sides of the strip of filter material between dryer 27 and takeup spool 29, and measure hole size of the holes etched in the member in the manner described above. Gage 10 has an output connected by coupling means such as a lead 33 to a conventional control circuit 32 which is connected by a lead 34 to motor 30 to control the motor speed and hence the speed at which the strip of filter material is transported through the etching bath.

Control circuit 32 drives motor 30 at a constant speed as long as gage 10 receives an amount of radiation which is indicative of a desired hole size in the tape. If hole size begins to trend toward the high end of a permissible tolerance range, the gage output will increase, and control circuit 32 increases the speed of the motor. The etching time of the filter member is thereby reduced, and hole size is correspondingly brought back to the center of the permissible tolerance range. Should hole size begin to trend toward the low end of the permissible tolerance range, the gage output decreases and control circuit 32 decreases the speed of motor 30, increasing the etching time of the filter material in tank 24. The increased etching time results in enlarged holes through the filter member. Gage 10 can of course also be equipped with suitable conventional alarms for stopping the process or signalling an operator should hole size move outside the permissible range.

Use of the invention in a track-etching apparatus is not limited to controlling transport speed of the irradiated material which is being etched, as other parameters of the process may be varied to control hole size. For example, etching rate is partially dependent on temperature of the etching reagent. The output of gage 10 is therefore useful to control the power input to a bath heater (not shown) used to heat the etching reagent.

The invention is not limited to the use of a radiation source which emits alpha particles. For example, a source of soft beta radiation may be used, and a suitable beta gauge used to measure radiation passing through holes in the filter element. As described above, the beta gauge would be set to a detection threshold which rejects beta radiation of energy levels indicative of passage through the full thickness of the filter member, and only the higher energy radiation passing partially or wholly through holes in the member is detected. Similarly, if the filter element is opaque to light, a conventional light bulb can be used as a source of radiation, and a photocell detector used to measure the amount of light passing through the holes in the member.

There has been described a system for measuring and detecting small holes in a filter element or other perforated member. The system is adapted to determination of the presence of holes, the size of holes, and the permeability of a member. The apparatus of the invention can be assembled from commercially available components, and operation is inexpensive, quick and simple.

What we claim is:

1. Apparatus for continuously manufacturing a filter web having uniform hole size which comprises, in series:
   a. a tank adapted to contain an etching solution;
   b. means to continuously feed a web of fission fragment irradiated dielectric material through said tank, whereby holes are etched through said web along fission fragment paths, hole size depending upon residence time in the etching solution;
   c. means to rinse and dry said web;
   d. a radiation source adjacent said web;
   e. radiation-measuring means positioned to receive radiation from said source which has passed through said web, said radiation measuring means adjusted to measure only radiation which has at least partially passed through holes in said web; and
   f. variable speed web drive means responsive to said measuring means to adjust residence time of said web in solution to maintain hole size within the desired range.

2. The apparatus defined in claim 1 in which the radiation source emits alpha particles, and the radiation measuring means is sensitive to alpha particles.

3. The apparatus defined in claim 1 in which the holes in the material have diameters less than about 10 microns.

4. The apparatus defined in claim 1, in which the sheet of material is opaque to light, and in which the radiation source emits light and the radiation-measuring means is sensitive to light.

5. A method of filter hole size measurement and control which comprises:
   a. passing a continuous web of fission fragment irradiated dielectric material through an etching bath wherein holes are formed through said web along fission fragment paths; hole size being a function of residence time in said bath;
   b. rinsing and drying said web;
   c. irradiating said web with a known amount of radiation;
   d. measuring the amount of radiation passing at least partially through the holes; and
   e. varying the residence time of said web in said etching bath by varying the speed of a web drive means in accordance with said measured radiation to maintain hole size within the desired range.

6. The method defined in claim 5 in which the radiation is alpha radiation.